(12) United States Patent
Wang et al.

(10) Patent No.: US 8,098,436 B2
(45) Date of Patent: Jan. 17, 2012

(54) LENS MODULE WITH ADHESIVELY MOUNTED FILTER

(75) Inventors: Chun-Kai Wang, Taipei Hsien (TW);
Hou-Yao Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/793,619

(22) Filed: Jun. 3, 2010

(65) Prior Publication Data

US 2011/0122515 A1    May 26, 2011

(30) Foreign Application Priority Data

Nov. 25, 2009 (CN) .......................... 2009 1 0310369

(51) Int. Cl.
*G02B 7/02* (2006.01)

(52) U.S. Cl. ........................................ 359/618; 359/694
(58) Field of Classification Search .................. 359/819
See application file for complete search history.

(56) References Cited

U.S. PATENT DOCUMENTS

2007/0183773 A1* 8/2007 Aoki et al. .................... 396/529
* cited by examiner

*Primary Examiner* — Ricky Mack
*Assistant Examiner* — James Jones
(74) *Attorney, Agent, or Firm* — Altis Law Group, Inc.

(57) ABSTRACT

A lens module includes a barrel and a parallelogram-shaped filter. The barrel defines a through hole bounded by an inner circumferential surface thereof. The barrel includes an end surface substantially perpendicular to the inner circumferential surface. The barrel further defines four positioning cutouts extending from the end surface to the inner circumferential surface. The parallelogram-shaped filter includes four corners fixed in the four positioning cutouts of the barrel.

12 Claims, 3 Drawing Sheets

LENS MODULE WITH ADHESIVELY MOUNTED FILTER

BACKGROUND

1. Technical Field

The present disclosure relates to imaging technology and, particularly, to a lens module with adhesively mounted filter.

2. Description of Related Art

Lens modules used in digital camera modules etc. typically include a barrel, a number of lenses, a number of spacers, and a filter. The lenses and the spacers are received in the barrel. Generally, the filter is round and fixed to the barrel by adhesive/glue dispensed on a circumferential surface of the filter. However, the non-uniformity and/or the insufficiency (e.g., not enough of initially applied; not adequately durable; etc.) of the adhesive will likely allow the filter to fall out of the barrel, in the long run. Furthermore, round shaped filters are more difficult to manufacture relative to square filters.

What is needed is a lens module to overcome or at least mitigate the above described problem.

BRIEF DESCRIPTION OF THE DRAWINGS

Many aspects of the present lens module can be better understood with reference to the accompanying drawings. The components in the drawings are not necessarily drawn to scale, the emphasis instead being placed upon clearly illustrating the principle of the lens module. In the drawings, all the views are schematic.

DETAILED DESCRIPTION

Embodiments of the present disclosure will be described in detail below, with reference to the accompanying drawings.

Figure 1:
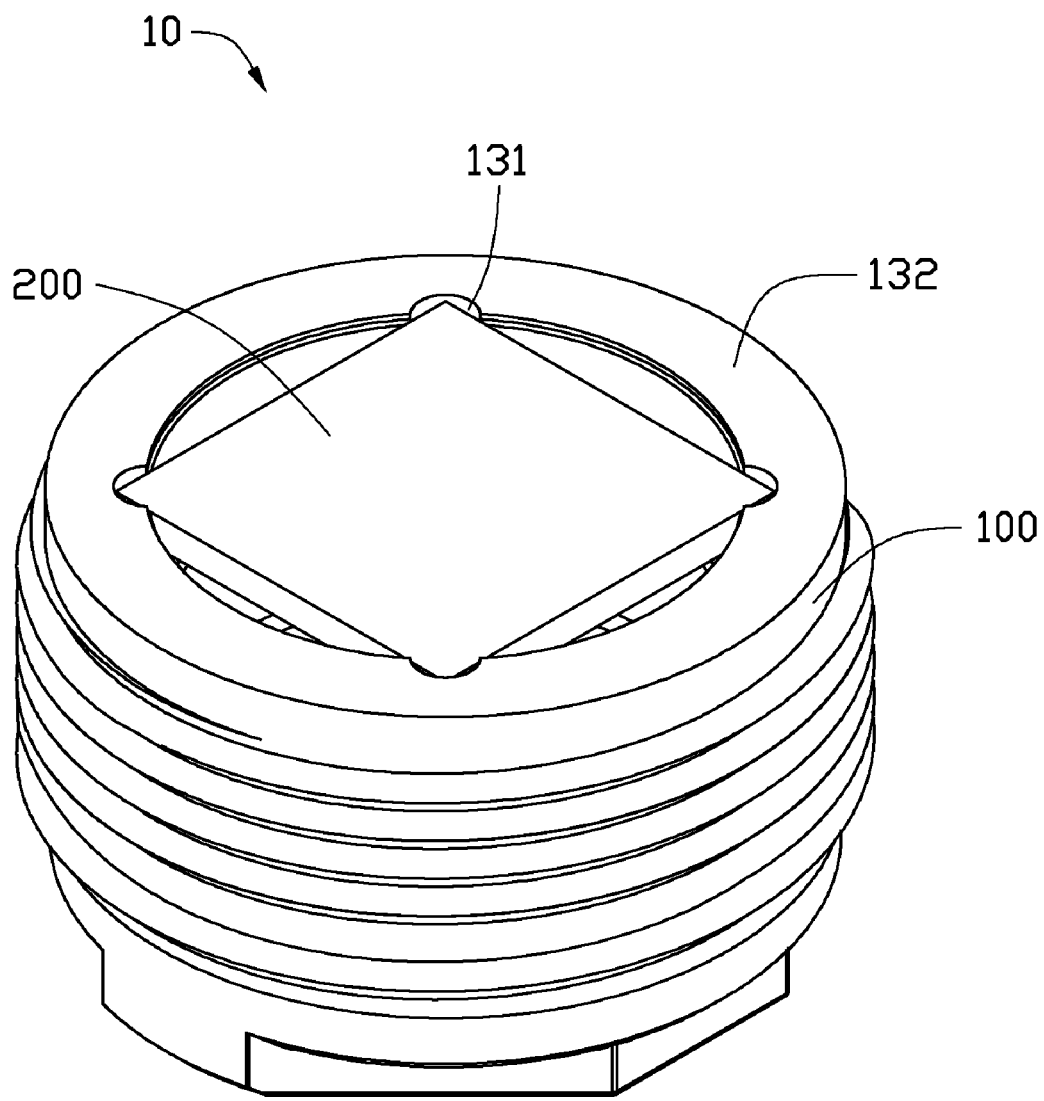
FIG. 1 is an isometric view of a lens module according to an exemplary embodiment.
Figure 2:
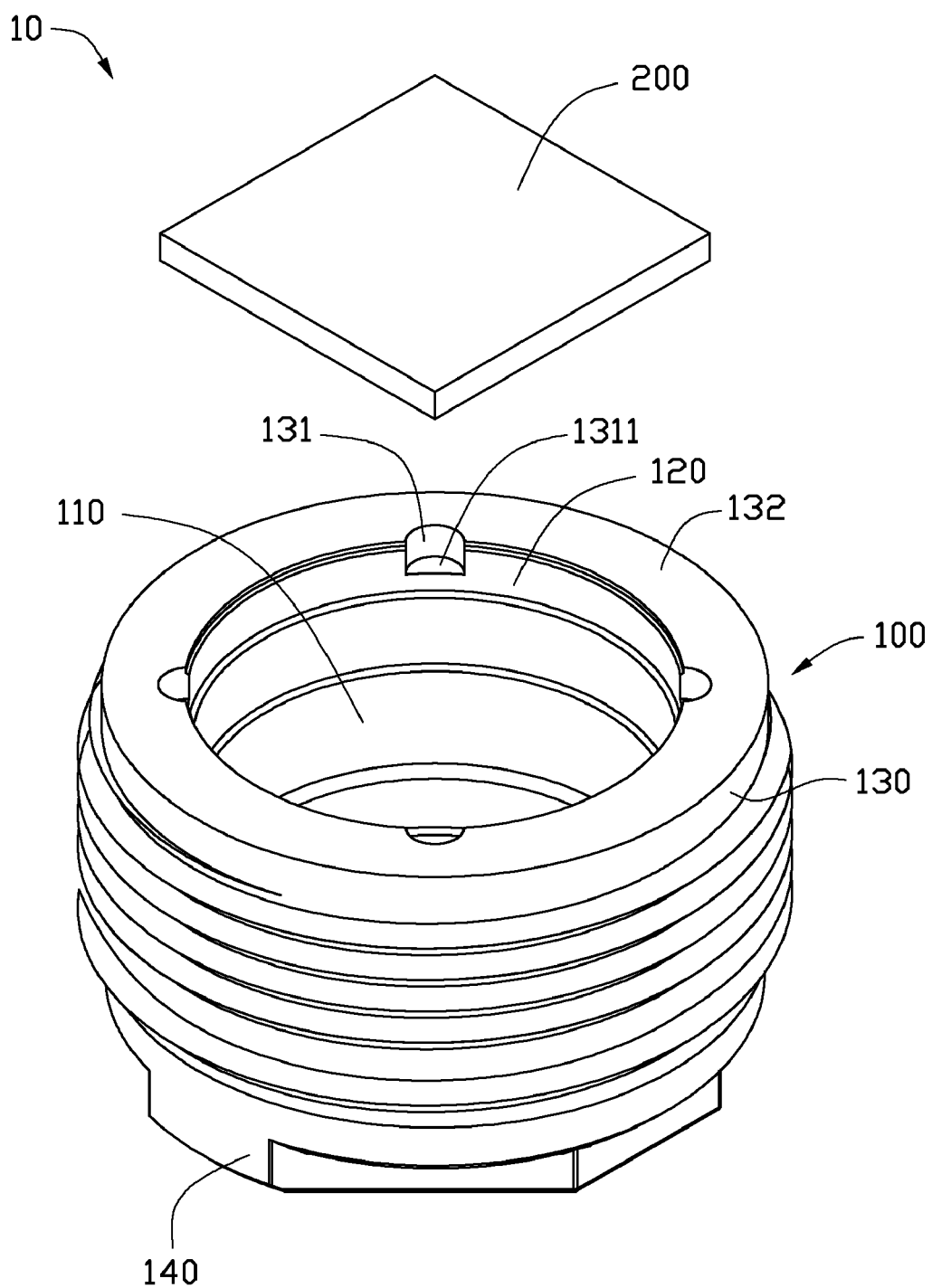
FIG. 2 is an isometric, exploded view of the lens module of FIG. 1.
Figure 3:
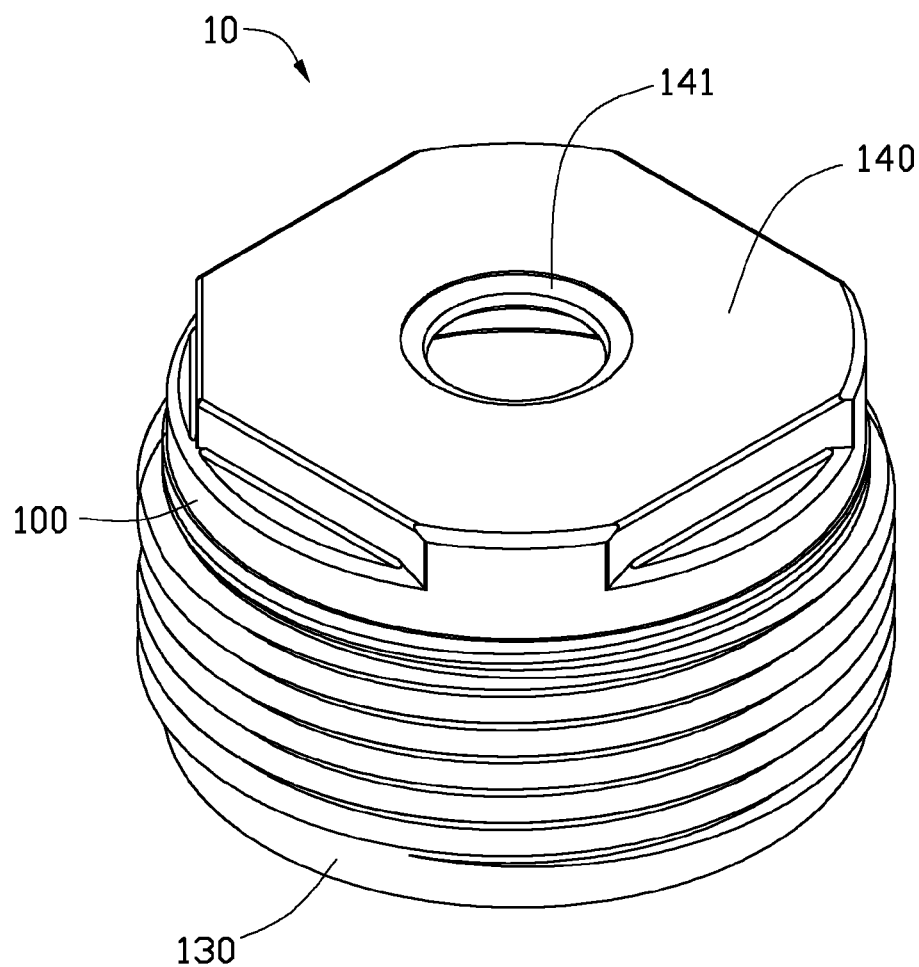
FIG. 3 is an isometric view of the lens module of FIG. 1 viewed from an opposite direction.

Referring to FIGS. 1 to 3, a lens module 10, according to an exemplary embodiment, is shown. The lens module 10 may be used in a camera, a mobile phone, etc. The lens module 10 includes a barrel 100, a filter 200, and at least one lens (not visible) received in the barrel 100.

The barrel 100 is substantially a hollow cylinder. The barrel 100 defines a through hole 110 bounded by an inner circumferential surface 120. The barrel 100 has a partially closed end 140 and an open end 130. The open end 130 is opposite to the partially closed end 140. The partially closed end 140 is adjacent to the object side of the lens module 10, and the open end 130 is adjacent to the image side of the lens module 10.

The partially closed end 140 defines a light aperture 141 through which light passing through the lens module 10 may travel. The open end 130 includes an end surface 132 substantially perpendicular to the inner circumferential surface 120. The barrel 100 defines four positioning cutouts 131 extending from the end surface 132 to the inner circumferential surface 120. The four positioning cutouts 131 are arranged on a parallelogram. A bottom wall 1311 of each positioning cutout 131 is substantially perpendicular to the inner circumferential surface 120 of the lens module 10, and the bottom wall 1311 is flat.

The filter 200 is used to selectively transmit light having certain desired/chosen properties, while blocking light lacking those desired properties. The filter 200 can be an IR-cut filter, a UV-cut filter, etc. In the present embodiment, the filter 200 is an IR-cut filter. The filter 200 is parallelogram-shaped, therefore, a number of the filters 200 can be manufactured easily by cutting a larger filter into a number of parallelogram-shaped smaller filters. In the present embodiment, the filter 200 is rectangle shaped. The four corners of the filter 200 are received in the four positioning cutouts 131 of the barrel 100, respectively. The four corners of the filter 200 are fixed in the positioning cutouts 131 by adhesive or glue and attached to the bottom walls 1311 of the positioning cutouts 131. The length of the diagonal of the filter 200 is larger than the inner diameter of the barrel 100, and is smaller than the outer diameter of the barrel 100.

In assembly of the lens module 10, to fix the filter 200 to the barrel 100, adhesive or glue is dispensed into the positioning cutouts 131 first. The four corners of the filter 200 can be put into the four cutouts 131, respectively, and at last, the adhesive or glue is solidified to fix the filter 200 to the barrel 100. In the present embodiment, the adhesive or glue only needs to be dispensed into the four positioning cutouts 131, thus, the adhesive or glue dispensing process during assembling of the lens module 10 would be much easier.

It is understood that, the shape of the positioning cutouts 131 can be designed to be the same to that of the four corners of the filter 200, therefore, the filter 200 would be fixed to the barrel 100 not only by the adhesive or glue, but also by means of the engagement between the four corners of the filter 200 and the four positioning cutouts 131.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope and spirit of the appended claims.

What is claimed is:

1. A lens module comprising:
   a barrel defines a through hole bounded by an inner circumferential surface thereof, the barrel comprising an end surface substantially perpendicular to the inner circumferential surface, the barrel further defines four positioning cutouts extending from the end surface to the inner circumferential surface; and
   a parallelogram-shaped filter having four corners thereof fixed in the four positioning cutouts of the barrel, wherein the shape of the four positioning cutouts is the same as that of the four corners of the filter, and the four corners of the filter are engaged with the four positioning cutouts.

2. The lens module as claimed in claim 1, wherein the barrel is substantially a hollow cylinder.

3. The lens module as claimed in claim 1, wherein the barrel comprises a partially closed end and an open end opposite to the partially closed end.

4. The lens module as claimed in claim 3, wherein the partially closed end is adjacent to the object side of the lens module, and the open end is adjacent to the image side of the lens module.

5. The lens module as claimed in claim 4, wherein the end surface is at the open end.

6. The lens module as claimed in claim 4, wherein the partially closed end defines a light aperture through.

7. The lens module as claimed in claim 1, wherein the four positioning cutouts are arranged on a parallelogram.

8. The lens module as claimed in claim 1, wherein a bottom wall of each positioning cutout substantially perpendicular to the inner circumferential surface of the lens module is flat.

9. The lens module as claimed in claim 1, wherein the filter is an IR-cut filter or a UV-cut filter.

10. The lens module as claimed in claim 1, wherein the filter is rectangle-shaped.

11. The lens module as claimed in claim 1, wherein the four corners of the filter are fixed in the positioning cutouts by adhesive or glue.

12. The lens module as claimed in claim 1, wherein the length of the diagonal of the filter is larger than the inner diameter of the barrel, and the length of the diagonal is smaller than the outer diameter of the barrel.

* * * * *